(12) United States Patent
Li et al.

(10) Patent No.: US 11,307,686 B2
(45) Date of Patent: Apr. 19, 2022

(54) TOUCH DISPLAY PANEL AND TOUCH DISPLAY DEVICE

(71) Applicant: HUIZHOU CHINA STAR OPTOELECTRONICS TECHNOLOGY CO., LTD., Huizhou (CN)

(72) Inventors: Quan Li, Huizhou (CN); Yuchun Hsiao, Huizhou (CN); Guofu Tang, Huizhou (CN)

( * ) Notice: Subject to any disclaimer, the term of this patent is extended or adjusted under 35 U.S.C. 154(b) by 240 days.

(21) Appl. No.: 16/618,804

(22) PCT Filed: Nov. 5, 2019

(86) PCT No.: PCT/CN2019/115555
§ 371 (c)(1),
(2) Date: Dec. 3, 2019

(87) PCT Pub. No.: WO2021/008011
PCT Pub. Date: Jan. 21, 2021

(65) Prior Publication Data
US 2021/0333912 A1    Oct. 28, 2021

(30) Foreign Application Priority Data

Jul. 16, 2019 (CN) .......................... 201910642561.4

(51) Int. Cl.
*B32B 7/12* (2006.01)
*G06F 3/041* (2006.01)

(52) U.S. Cl.
CPC .............. *G06F 3/0412* (2013.01); *B32B 7/12* (2013.01); *B32B 2307/4023* (2013.01); *B32B 2307/71* (2013.01); *B32B 2457/208* (2013.01)

(58) Field of Classification Search
CPC ............................ B32B 7/12; B32B 2457/208
See application file for complete search history.

(56) References Cited

U.S. PATENT DOCUMENTS 10,877,603 B2 *  12/2020  Yoo .................. G02B 5/208

FOREIGN PATENT DOCUMENTS

| CN | 105353910 A | 2/2016 |
|---|---|---|
| CN | 105607321 A | 5/2016 |
| CN | 206757245 U | 12/2017 |
| CN | 109752888 A | 5/2019 |

* cited by examiner

*Primary Examiner* — Elizabeth E Mulvaney

(57) ABSTRACT

The present disclosure provides a touch display panel and a touch display device, wherein the touch display panel including a touch display module, a cover plate, a sealant and a first ink layer, the sealant disposed at a peripheral region between the touch display module and the cover plate. The first ink layer includes a first sub ink layer and a second sub ink layer, the second sub-ink layer disposed corresponding to the set region of the sealant, and an ultraviolet transmittance of the second sub ink layer is greater than an ultraviolet transmittance of the first sub ink layer.

18 Claims, 1 Drawing Sheet

TOUCH DISPLAY PANEL AND TOUCH DISPLAY DEVICE

FIELD OF INVENTION

The present disclosure relates to the field of display technologies, and more particularly to a touch display panel and a touch display device.

BACKGROUND OF INVENTION

In touch display devices, a glass cover and a touch display module are generally attached by frame bonding technology. In the prior art, because ultraviolet curing type glue can be quickly cured, it is widely used. However, because an inner surface of the glass cover plate needs printing ink, and the ink affects curing of the ultraviolet curing type glue, the ultraviolet curing type glue is insufficiently cured.

SUMMARY OF INVENTION

The embodiments of the present disclosure provide a touch display panel and a touch display device, which solves the technical problem that the ultraviolet light curing glue is insufficiently cured when the conventional touch display device uses the ultraviolet curing glue to perform frame coating.

An embodiment of the present disclosure provides a touch display panel, including:

a touch display module, the touch display module configured to implement touch and display functions;

a cover plate, the cover plate disposed on the touch display module;

a sealant, the sealant disposed at a peripheral region between the touch display module and the cover plate for fixedly connecting the touch display module and the cover plate; and a first ink layer, the first ink layer disposed at a peripheral region of a side of the cover plate facing the sealant for shielding metal traces, wherein;

the first ink layer includes a first sub ink layer and a second sub ink layer, the first sub ink layer and the second sub ink layer both extending along a circumferential direction of the cover plate and forming a closed structure, the second sub-ink layer disposed corresponding to the set region of the sealant, wherein an ultraviolet transmittance of the second sub ink layer is greater than an ultraviolet transmittance of the first sub ink layer;

the touch display module includes a display module and a touch function layer disposed on the display module, the touch display panel further including a second ink layer, the second ink layer disposed on the touch function layer facing a peripheral region of one side of the sealant;

the second ink layer is disposed corresponding to the second sub-ink layer; and the first sub-ink layer is an ultraviolet ink layer, and the second sub-ink layer is an infrared ink layer.

In the touch display panel of the present disclosure, an orthographic projection region of the second ink layer on a plane of the cover plate is larger than an orthographic projection region of the second sub-ink layer on a plane of the cover plate.

In the touch display panel of the present disclosure, the second ink layer is a black ink layer.

In the touch display panel of the present disclosure, an ultraviolet light transmittance of the second sub-ink layer is 10% or more than 10%.

In the touch display panel of the present disclosure, an orthographic projection region of the second sub-ink layer on a plane of the cover plate is larger than an orthographic projection region of the sealant on a plane of the cover plate.

In the touch display panel of the present disclosure, a boundary line of the second sub-ink layer has a sawtooth, wavy or linear shape.

In the touch display panel of the present disclosure, the first ink layer includes two first sub-ink layers, and the second sub-ink layer is disposed between the two first sub-ink layers.

An embodiment of the present disclosure further provides a touch display panel, including:

a touch display module, the touch display module configured to implement touch and display functions;

a cover plate, the cover plate disposed on the touch display module;

a sealant, the sealant disposed at a peripheral region between the touch display module and the cover plate for fixedly connecting the touch display module and the cover; and a first ink layer, the first ink layer disposed at a peripheral region of a side of the cover plate facing the sealant for shielding metal traces; wherein the first ink layer includes a first sub ink layer and a second sub ink layer, the first sub ink layer and the second sub ink layer both extending along a circumferential direction of the cover plate and forming a closed structure, the second sub-ink layer disposed corresponding to the set region of the sealant, wherein an ultraviolet transmittance of the second sub ink layer is greater than an ultraviolet transmittance of the first sub ink layer.

In the touch display panel of the present disclosure, the touch display module includes a display module and a touch function layer disposed on the display module, the touch display panel further including a second ink layer, the second ink layer disposed on the touch function layer facing a peripheral region of one side of the sealant;

the second ink layer is disposed corresponding to the second sub-ink layer.

In the touch display panel of the present disclosure, an orthographic projection region of the second ink layer on a plane of the cover plate is larger than an orthographic projection region of the second sub-ink layer on a plane of the cover plate.

In the touch display panel of the present disclosure, the second ink layer is a black ink layer.

In the touch display panel of the present disclosure, the first sub-ink layer is an ultraviolet ink layer, and the second sub-ink layer is an infrared ink layer.

In the touch display panel of the present disclosure, an ultraviolet light transmittance of the second sub-ink layer is 10% or more than 10%.

In the touch display panel of the present disclosure, an orthographic projection region of the second sub-ink layer on a plane of the cover plate is larger than an orthographic projection region of the sealant on a plane of the cover plate.

In the touch display panel of the present disclosure, a boundary line of the second sub-ink layer has a sawtooth, wavy or linear shape.

In the touch display panel of the present disclosure, the first ink layer includes two first sub-ink layers, and the second sub-ink layer is disposed between the two first sub-ink layers.

An embodiment of the present disclosure further provides a touch display device, including:

a touch display module, the touch display module configured to implement touch and display functions;

a cover plate, the cover plate disposed on the touch display module;

a sealant, the sealant disposed at a peripheral region between the touch display module and the cover plate for fixedly connecting the touch display module and the cover; and a first ink layer, the first ink layer disposed at a peripheral region of a side of the cover plate facing the sealant for shielding metal traces; wherein the first ink layer includes a first sub ink layer and a second sub ink layer, the first sub ink layer and the second sub ink layer both extending along a circumferential direction of the cover plate and forming a closed structure, the second sub-ink layer disposed corresponding to the set region of the sealant, wherein an ultraviolet transmittance of the second sub ink layer is greater than an ultraviolet transmittance of the first sub ink layer.

In the touch display device of the present disclosure, the touch display module includes a display module and a touch function layer disposed on the display module, the touch display panel further including a second ink layer, the second ink layer disposed on the touch function layer facing a peripheral region of one side of the sealant;

the second ink layer is disposed corresponds to the second sub-ink layer.

In the touch display device of the present disclosure, an orthographic projection region of the second ink layer on a plane of the cover plate is larger than an orthographic projection region of the second sub-ink layer on a plane of the cover plate.

In the touch display device of the present disclosure, the second ink layer is a black ink layer.

In the touch display device of the present disclosure, the first sub-ink layer is an ultraviolet ink layer, and the second sub-ink layer is an infrared ink layer.

In the touch display device of the present disclosure, an ultraviolet light transmittance of the second sub-ink layer is 10% or more than 10%.

In the touch display device of the present disclosure, an orthographic projection region of the second sub-ink layer on a plane of the cover plate is larger than an orthographic projection region of the sealant on a plane of the cover plate.

In the touch display device of the present disclosure, a boundary line of the second sub-ink layer has a sawtooth, wavy or linear shape.

In the touch display device of the present disclosure, the first ink layer includes two first sub-ink layers, and the second sub-ink layer is disposed between the two first sub-ink layers.

Compared with the touch display device of the prior art, the touch display panel and the touch display device of the present application achieve the effect of fully curing the sealant by increasing the ultraviolet light transmittance of the second sub-ink layer corresponding to the set region of the sealant; solve the technical problem that the ultraviolet curing type glue is insufficiently cured when the conventional touch display device is framed by the ultraviolet curing type glue.

DESCRIPTION OF DRAWINGS

In order to more clearly illustrate the embodiments of the present disclosure or the technical solutions in the prior art, the drawings used in the embodiments will be briefly described below. The drawings in the following description are only partial embodiments of the present disclosure, and those skilled in the art can obtain other drawings according to these drawings without any creative work.

DETAILED DESCRIPTION OF PREFERRED EMBODIMENTS

Please refer to the drawings, units with similar structures are labeled with the same reference number. The following description is based on the specific embodiments of the present disclosure as illustrated, and should not be construed as limiting the specific embodiments that are not described herein.

Figure 1:
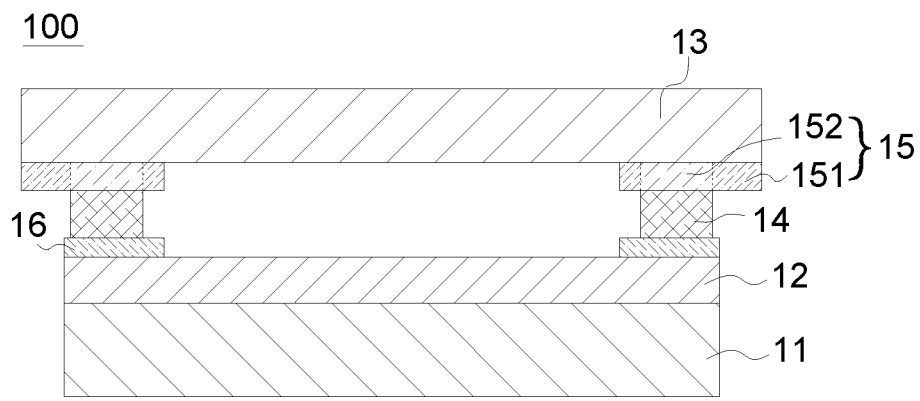
FIG. 1 is a schematic structural diagram of a touch display panel according to an embodiment of the present disclosure.
Figure 2:
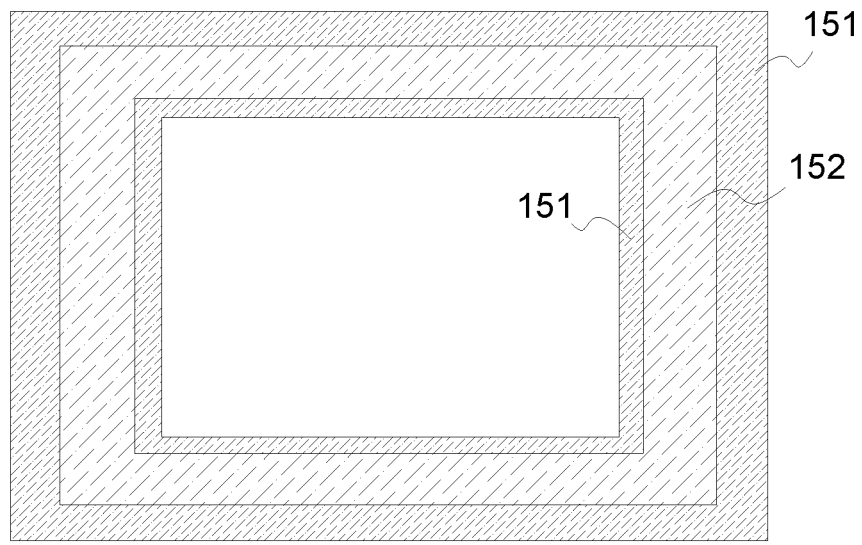
FIG. 2 is a schematic structural diagram of a first ink layer of a touch display panel according to an embodiment of the present application.

Please refer to FIG. 1 and FIG. 2, FIG. 1 is a schematic structural diagram of a touch display panel according to an embodiment of the present disclosure; FIG. 2 is a schematic structural diagram of a first ink layer of a touch display panel according to an embodiment of the present application.

An embodiment of the present disclosure provides a touch display panel 100, including a touch display module, a cover plate 13, a sealant 14, a first ink layer 15, and a second ink layer 16.

The touch display module configured to implement touch and display functions. The touch display module includes a display module 11 and a touch function layer 12 disposed on the display module 11. The cover plate 13 disposed on the touch display module.

The sealant 14 disposed at a peripheral region between the touch display module and the cover plate 13 for fixedly connecting the touch display module and the cover plate 13. The first ink layer 15 disposed at a peripheral region of a side of the cover plate 13 facing the sealant 14 for shielding metal traces.

The first ink layer 15 includes a first sub ink layer 151 and a second sub ink layer 152, the first sub ink layer 151 and the second sub ink layer 152 both extending along a circumferential direction of the cover plate 13 and forming a closed structure. The second sub-ink layer 152 disposed corresponding to the set region of the sealant 14, wherein an ultraviolet transmittance of the second sub ink layer 152 is greater than an ultraviolet transmittance of the first sub ink layer 151.

The touch display panel of the embodiment of the present application increases the ultraviolet light transmittance of the second sub-ink layer 152.

The touch display panel of the embodiment of the present disclosure increases the ultraviolet light transmittance of the second sub-ink layer 152 so that the ultraviolet light can be more transmitted to the sealant 14 through the second sub-ink layer 152, thereby causing the sealant 14 to be sufficiently cured.

Optionally, the first sub-ink layer 151 is an ultraviolet ink layer, and the second sub-ink layer 152 is an infrared ink layer.

An ultraviolet light transmittance of the second sub-ink layer is 10% or more than 10%. In this embodiment, an ultraviolet light transmittance of the second sub-ink layer 152 is 20%.

In the touch display panel 100 of the present disclosure, an orthographic projection region of the second sub-ink layer 152 on a plane of the cover plate 13 is larger than an orthographic projection region of the sealant 14 on a plane of the cover plate 13. With such an arrangement, the amount of ultraviolet light transmitted by the second sub-ink layer 152 is increased, and the sealant 14 is further sufficiently cured.

Optionally, a boundary line of the second sub-ink layer 152 has a sawtooth, wavy or linear shape.

In the touch display panel 100 of the present disclosure, the first ink layer 15 includes two first sub-ink layers 151, and the second sub-ink layer 152 is disposed between the two first sub-ink layers 151.

In this embodiment, the touch display panel 100 further including a second ink layer 16, the second ink layer 16 disposed on the touch function layer 12 facing a peripheral region of one side of the sealant 14. The second ink layer 16 is disposed corresponding to the second sub-ink layer 152.

The difference in the ultraviolet light transmittance of the second sub-ink layer 152 and the first sub-ink layer 151 is due to the difference in the ratio of the manufacturing material. The difference in the ratio of the manufacturing material of the second sub-ink layer 152 and the first sub-ink layer 151 causes the second sub-ink layer 152 and the first sub-ink layer 151 to have different colors, so there are two different ink layers appeared when the cover 13 is seen.

The color of the second ink layer 16 is the same as the color of the first sub-ink layer 151, both of which are black.

The arrangement of the second ink layer 16 serves to shield the set region of the second sub-ink layer 152, so that the difference in appearance between the two ink layers on the surface of the cover plate cannot be seen.

An orthographic projection area of the second ink layer 16 on the plane of the cover plate 13 is larger than an orthographic projection area of the second sub-ink layer 152 on the plane of the cover plate 13. Such an arrangement is to completely shield the second sub-ink layer 152.

The present disclosure further provides a touch display device, the touch display device includes the touch display panel 100 described above.

Compared with the touch display device of the prior art, the touch display panel and the touch display device of the present application achieve the effect of fully curing the sealant by increasing the ultraviolet light transmittance of the second sub-ink layer corresponding to the set region of the sealant; solve the technical problem that the ultraviolet curing type glue is insufficiently cured when the conventional touch display device is framed by the ultraviolet curing type glue.

In the above, various other changes and modifications can be made by those skilled in the art in accordance with the technical solutions and technical concept of the present disclosure, and all such changes and modifications are intended to be included within the scope of the appended claims.

What is claimed is:

1. A touch display panel, comprising:
    a touch display module, the touch display module configured to implement touch and display functions;
    a cover plate, the cover plate disposed on the touch display module;
    a sealant, the sealant disposed at a peripheral region between the touch display module and the cover plate for fixedly connecting the touch display module and the cover plate; and
    a first ink layer, the first ink layer disposed at a peripheral region of a side of the cover plate facing the sealant for shielding metal traces, wherein
    the first ink layer comprises a first sub ink layer and a second sub ink layer, the first sub ink layer and the second sub ink layer both extending along a circumferential direction of the cover plate and forming a frame structure disposed between the sealant and the cover plate, the second sub-ink layer disposed corresponding to the set region of the sealant, wherein an ultraviolet transmittance of the second sub ink layer is greater than an ultraviolet transmittance of the first sub ink layer;
    the touch display module comprises a display module and a touch function layer disposed on the display module, the touch display panel further comprising a second ink layer, the second ink layer disposed on the touch function layer facing a peripheral region of one side of the sealant;
    the second ink layer is disposed corresponding to the second sub-ink layer; and
    the first sub-ink layer is an ultraviolet ink layer, and the second sub-ink layer is an infrared ink layer;
    wherein the first ink layer comprises two first sub-ink layers, and the second sub-ink layer is disposed between the two first sub-ink layers.

2. The touch display panel as claimed in claim 1, wherein an orthographic projection region of the second ink layer on a plane of the cover plate is larger than an orthographic projection region of the second sub-ink layer on a plane of the cover plate.

3. The touch display panel as claimed in claim 1, wherein the second ink layer is a black ink layer.

4. The touch display panel as claimed in claim 1, wherein an ultraviolet light transmittance of the second sub-ink layer is 10% or more than 10%.

5. The touch display panel as claimed in claim 1, wherein an orthographic projection region of the second sub-ink layer on a plane of the cover plate is larger than an orthographic projection region of the sealant on a plane of the cover plate.

6. The touch display panel as claimed in claim 5, wherein a boundary line of the second sub-ink layer has a sawtooth, wavy or linear shape.

7. A touch display panel, comprising:
    a touch display module, the touch display module configured to implement touch and display functions;
    a cover plate, the cover plate disposed on the touch display module;
    a sealant, the sealant disposed at a peripheral region between the touch display module and the cover plate for fixedly connecting the touch display module and the cover; and
    a first ink layer, the first ink layer disposed at a peripheral region of a side of the cover plate facing the sealant for shielding metal traces; wherein
    the first ink layer comprises a first sub ink layer and a second sub ink layer, the first sub ink layer and the second sub ink layer both extending along a circumferential direction of the cover plate and forming a frame structure disposed between the sealant and the cover plate, the second sub-ink layer disposed corresponding to the set region of the sealant, wherein an ultraviolet transmittance of the second sub ink layer is greater than an ultraviolet transmittance of the first sub ink layer;
    wherein the first ink layer comprises two first sub-ink layers, and the second sub-ink layer is disposed between the two first sub-ink layers.

8. The touch display panel as claimed in claim 7, wherein the touch display module comprises a display module and a touch function layer disposed on the display module, the touch display panel further comprising a second ink layer, the second ink layer disposed on the touch function layer facing a peripheral region of one side of the sealant;
the second ink layer is disposed corresponding to the second sub-ink layer.

9. The touch display panel as claimed in claim 8, wherein an orthographic projection region of the second ink layer on a plane of the cover plate is larger than an orthographic projection region of the second sub-ink layer on a plane of the cover plate.

10. The touch display panel as claimed in claim 8, wherein the second ink layer is a black ink layer.

11. The touch display panel as claimed in claim 7, wherein the first sub-ink layer is an ultraviolet ink layer, and the second sub-ink layer is an infrared ink layer.

12. The touch display panel as claimed in claim 7, wherein an ultraviolet light transmittance of the second sub-ink layer is 10% or more than 10%.

13. The touch display panel as claimed in claim 7, wherein an orthographic projection region of the second sub-ink layer on a plane of the cover plate is larger than an orthographic projection region of the sealant on a plane of the cover plate.

14. The touch display panel as claimed in claim 13, wherein a boundary line of the second sub-ink layer has a sawtooth, wavy or linear shape.

15. A touch display device, comprising a touch display panel, the touch display panel, comprising:
a touch display module, the touch display module configured to implement touch and display functions;
a cover plate, the cover plate disposed on the touch display module;
a sealant, the sealant disposed at a peripheral region between the touch display module and the cover plate for fixedly connecting the touch display module and the cover; and
a first ink layer, the first ink layer disposed at a peripheral region of a side of the cover plate facing the sealant for shielding metal traces; wherein
the first ink layer comprises a first sub ink layer and a second sub ink layer, the first sub ink layer and the second sub ink layer both extending along a circumferential direction of the cover plate and forming a frame structure disposed between the sealant and the cover plate, the second sub-ink layer disposed corresponding to the set region of the sealant, wherein an ultraviolet transmittance of the second sub ink layer is greater than an ultraviolet transmittance of the first sub ink layer;
wherein the first ink layer comprises two first sub-ink layers, and the second sub-ink layer is disposed between the two first sub-ink layer.

16. The touch display device as claimed in claim 15, wherein the touch display module comprises a display module and a touch function layer disposed on the display module, the touch display panel further comprising a second ink layer, the second ink layer disposed on the touch function layer facing a peripheral region of one side of the sealant;
the second ink layer is disposed corresponds to the second sub-ink layer.

17. The touch display device as claimed in claim 16, wherein an orthographic projection region of the second ink layer on a plane of the cover plate is larger than an orthographic projection region of the second sub-ink layer on a plane of the cover plate.

18. The touch display device as claimed in claim 15, wherein the first sub-ink layer is an ultraviolet ink layer, and the second sub-ink layer is an infrared ink layer.

* * * * *